United States Patent
Fung et al.

(10) Patent No.: US 6,259,737 B1
(45) Date of Patent: *Jul. 10, 2001

(54) METHOD AND APPARATUS FOR FAST MOTION ESTIMATION IN VIDEO CODING

(75) Inventors: Patrick Fung; Shaun Yu, both of Singapore (SG)

(73) Assignee: InnoMedia Pte Ltd, Singapore (SG)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,513

(22) Filed: Jun. 5, 1998

(51) Int. Cl.$^7$ ........................................ H04N 7/12
(52) U.S. Cl. ........................ 375/240.16; 348/699
(58) Field of Search ............... 375/240.16, 240.17; 348/699, 700, 402.1, 407.1, 413.1, 416.1; 382/238, 239; 386/111

(56) References Cited

U.S. PATENT DOCUMENTS

| | | | | |
|---|---|---|---|---|
| 5,173,772 | * | 12/1992 | Choi | 348/416 |
| 5,276,513 | * | 1/1994 | van der Wal et al. | 348/416 |
| 5,351,095 | * | 9/1994 | Kerdranvat | 348/699 |
| 5,557,341 | * | 9/1996 | Weiss et al. | 348/699 |
| 5,557,684 | * | 9/1996 | Wang et al. | 382/107 |
| 5,706,059 | * | 1/1998 | Ran et al. | 348/699 |
| 5,742,710 | * | 4/1998 | Hsu et al. | 382/236 |
| 5,748,247 | * | 5/1998 | Hu | 348/413 |
| 5,793,429 | * | 8/1998 | Kim et al. | 348/416 |
| 5,802,220 | * | 9/1998 | Black et al. | 382/276 |
| 6,011,870 | * | 1/2000 | Jeng et al. | 382/236 |

OTHER PUBLICATIONS

Chan et al, "Adaptive Multiple–candidate Hierarchical Search for Block Matching Algorithm", Electronics Letters, vol. 31, No. 19, Sep. 14, 1995, pp. 1637–1639.*

L. Yu et al., "Hierarchical Motion Estimation Algorithms With Especially Low Hardware Costs", IEEE Transactions On Consumer Electronics, vol. 44, No. 1, Feb. 1, 1998, pp. 125–129.

R. Thoma et al., "Motion Compensating Interpolation Considering Covered And Uncovered Background", Signal Processing Image Communication, vol. 1, No. 2, Oct. 1, 1989, pp. 191–212.

V. H. Plansky et al., "Bilddatenreduktion und ihre Anwendung bei HDTV", Frequenz, vol. 46, No. 3/4, Mar. 1, 1992, pp. 102–109.

John Watkinson, "The Art of Digital Video, Second Edition," Copyright 1990 and 1994, pp. 234–278.

* cited by examiner

Primary Examiner—Vu Le
(74) Attorney, Agent, or Firm—McCutchen, Doyle, Brown & Enersen LLP

(57) ABSTRACT

A computationally efficient method and apparatus for motion estimation by producing accurate motion vectors with minimal computational effort. A preferred embodiment of the present invention first identifies an approximate match between a reference frame and a current frame of video data. Once an approximate match is found, the method performs at least two searches at a finer pixel level, until a motion estimate is reached.

17 Claims, 9 Drawing Sheets

Fig. 6 Array of average values

Array of Average values

Round 1 fine-matching

Round 2 fine-matching

○ Marker pixel corresponding to search reuslt in coarse block-matching

● Marker pixels involved in round 1 fine block-matching

■ Marker pixels involved in round 2 fine block-matching

METHOD AND APPARATUS FOR FAST MOTION ESTIMATION IN VIDEO CODING

FIELD OF THE INVENTION

This application relates to a method and apparatus for improving the transmission of video information and, specifically, to a method and apparatus that ensures that improves motion estimation in video encoding.

BACKGROUND OF THE INVENTION

When video data is transmitted in real-time, it is desirable to send as little data as possible. Many conventional video compression standards use the technique of motion estimation in conjunction with a DCT (Discrete Cosine Transform). Although the DCT itself does not result in any reduction, it converts the input video into a form where redundancy can be easily detected. Data transmission can then take advantage of the temporal domain redundancies in the video bit-stream.

Unfortunately, although conventional motion estimation aids in bit compression of video data, it is extremely computation intensive. Thus, compromises are inevitable—and many conventional systems settle for a somewhat less accurate motion vector in exchange for a lower consumption of computing resources. FIG. 2 shows a conventional method of motion estimation. In this conventional method, a search block 230 is moved to all vertical and horizontal displacements of a reference block, on a pel-by-pel basis, to determine what movement has occurred between the reference block and the search block.

SUMMARY OF THE INVENTION

The described embodiments of the present invention provide a method and apparatus that provides a computationally efficient method for motion estimation by producing accurate motion vectors with minimal computational effort. A preferred embodiment of the present invention first identifies an approximate match between a reference frame and a current frame of video data (also called a "search frame" or "search block."). Once an approximate match is found, the method performs at least two searches at a finer pixel level, until a motion estimate is reached.

In a first step, the described embodiment of the present invention determines an average intensity of sub-blocks of both the current video data and the reference video data. The intensity values of each of the sub-blocks are used to determine which elements of the reference video and the current video are most probably matches. For the identified matches, selected averages of the actual pixels of the two images are compared. A first described embodiment uses two rounds of looking at the averaged pixels. Other embodiments may use more or fewer rounds of looking at the pixels.

In accordance with the purpose of the invention, as embodied and broadly described herein, the invention relates to a method of generating a motion vector for a search block of video data, comprising the steps performed by a video processing system, of: performing a coarse-matching operation on the video data, which compares sub-blocks of the video data to sub-blocks of reference data; and performing, after the coarse-matching operation, a fine-matching operation, which compares the video data to reference data.

In further accordance with the purpose of the invention, as embodied and broadly described herein, the invention relates to an apparatus that generates a motion vector for a search block of video data, comprising: a portion configured to perform a coarse-matching operation on the video data, which compares sub-blocks of the video data to sub-blocks of reference data; and a portion configured to perform, after the coarse-matching operation, a fine-matching operation, which compares the video data to reference data.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF PREFERRED EMBODIMENTS

The following paragraphs describe a preferred embodiment of the present invention. Where convenient, the same reference numbers will be used to the same or like parts.

I. General Discussion

It is a common experience to be amazed at the efficiency of the human eye in performing block-matching. If, as an experiment, a pattern is flashed in front of a person and the person is asked to precisely locate a best match in a reference window of a larger size, the person tends to notice the general features and their relative positions rather than the fine details in the former image. With this reduced amount of information, people generally identify a first match, followed by a point-by-point fine-searching to obtain a final result.

Figure 1:
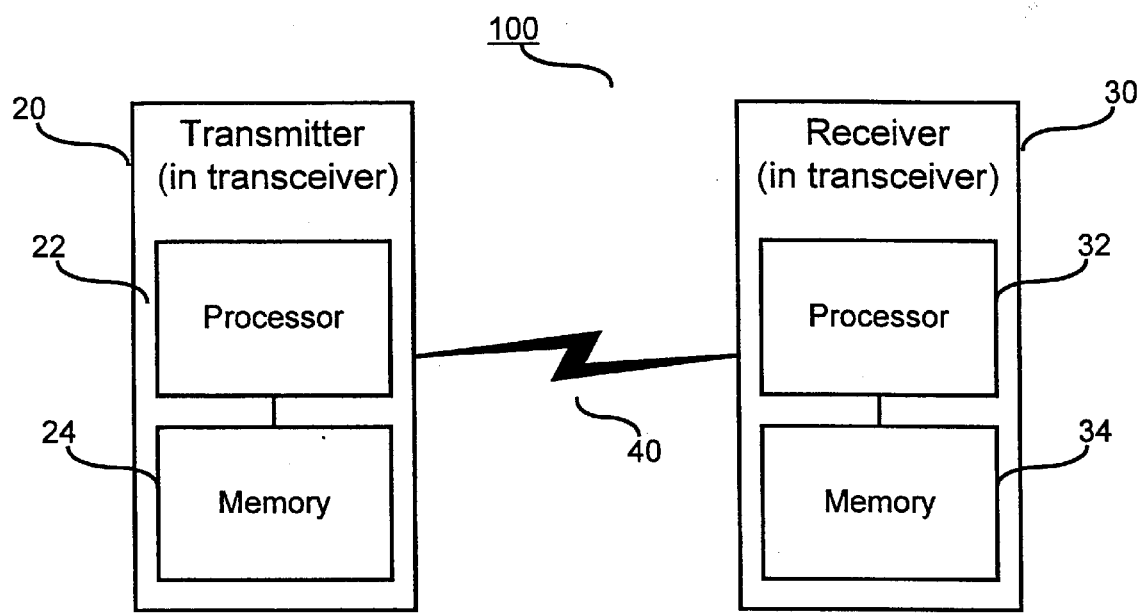
FIG. 1 is a block diagram of a video transmission system in accordance with a first preferred embodiment of the present invention.
Figure 2:
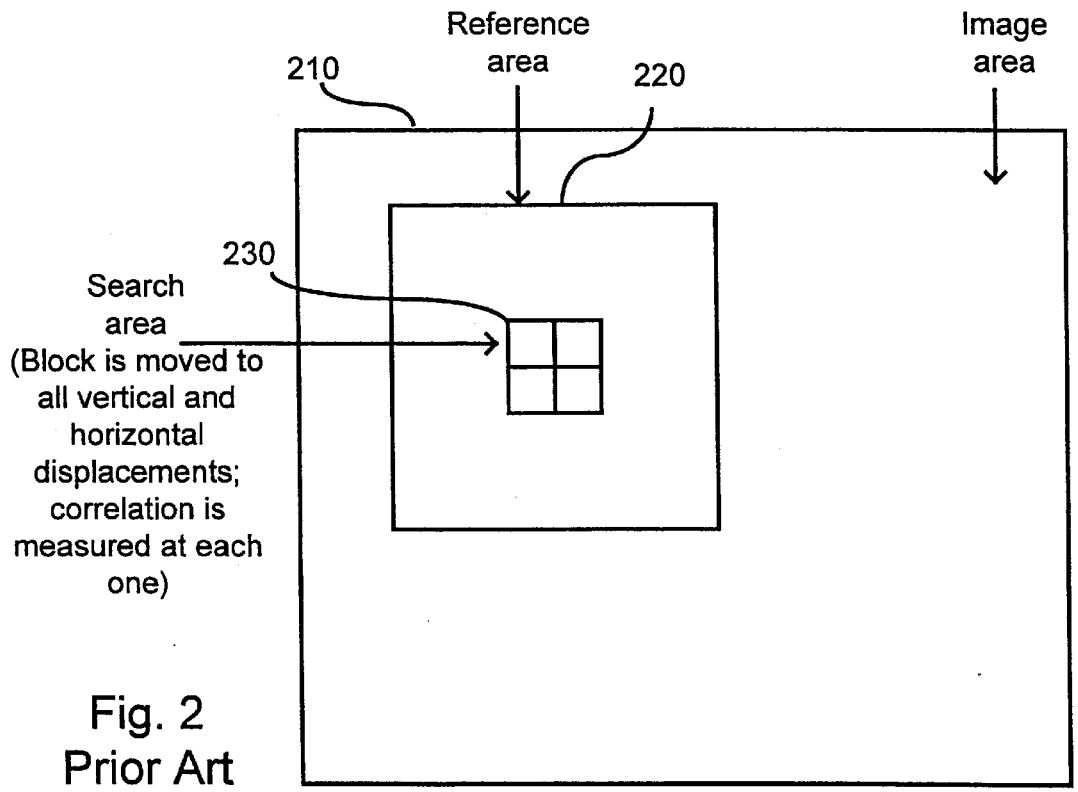
FIG. 2 is a diagram showing a conventional motion estimation method.

FIG. 1 is a block diagram of a video transmission system 100 in accordance with a first preferred embodiment of the present invention. FIG. 1 includes a transmitter (which can be part of a first transceiver) sending video data over connection 40 to a receiver (which can be part of a second transceiver). In the described embodiment, transmitter 20 and receiver 30 each include a processor 22, 32, and a memory 24, 34. Memory 24, 34, stores program instructions performing the steps of the flow chart of FIG. 3 and also including appropriate data structures, video data, and reference data as described below. Connection 40 can be any appropriate type of connection, such as a LAN, WAN, a hardware channel, the internet, etc.

It should be understood that the system of FIG. 1 is shown for purposes of example only. A person of ordinary skill in the art will understand that system 100 may also contain additional information, such as input/output lines; input devices, such as a keyboard, a mouse, and a voice input device; and display devices, such as a display terminal. Transmitter 20 and receiver 30 can be (or can be part of) general purpose computers, special purpose computers, or specialized hardware containing a processor and memory. Other embodiments of the invention may also be implemented in hardware, such as programmable logic devices, or in analog circuitry. One or more of system 100 may also include an input device, such as a floppy disk drive, CD ROM reader, or DVD reader, that reads computer instructions stored on a computer readable medium, such as a floppy disk, a CD ROM, or a DVD drive. System 100 also may include application programs, operating systems, data, etc., which are not shown in the figure for the sake of clarity.

In the following discussion, it will be understood that the steps of methods and flow charts discussed preferably are performed by processor 22 (or a similar processor) executing instructions stored in memory 24 (or other appropriate memory). It will also be understood that the invention is not limited to any particular implementation or programming technique and that the invention may be implemented using any appropriate techniques for implementing the functionality described herein. The invention is not limited to any particular programming language or operating system.

In alternative embodiments, hard-wired circuitry may be used in place of or in combination with software instructions to implement the invention. Thus, embodiment of the invention are not limited to any specific combination of hardware circuitry and software.

The term "computer-usable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-usable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

II. Specifics of A Preferred Embodiment

Figure 3A:
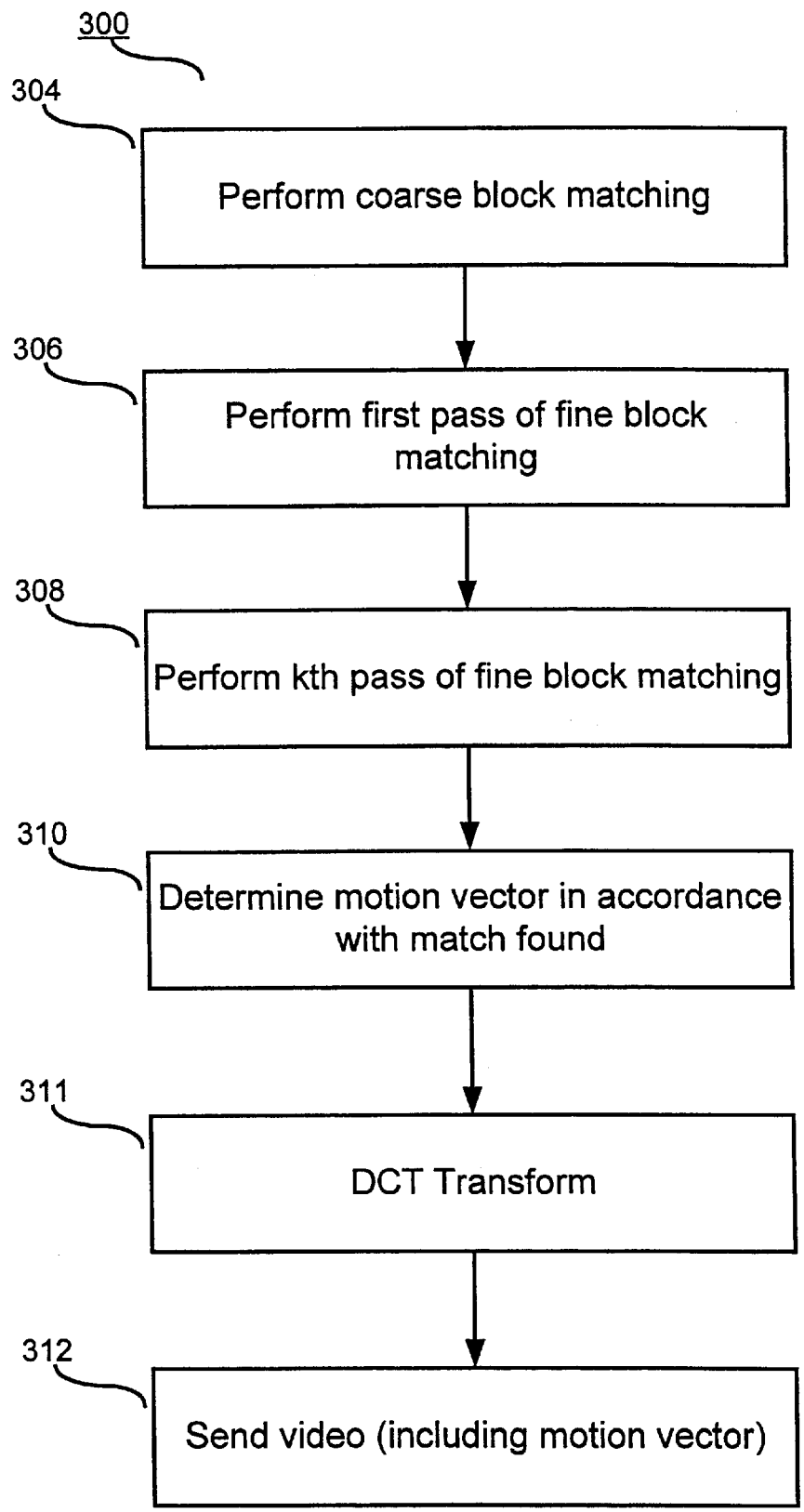
FIG. 3(a) is a flow chart showing steps of a method of motion estimation in accordance with a preferred embodiment of the present invention.

FIG. 3(*a*) is a flow chart showing steps of a method of motion estimation in accordance with a preferred embodiment of the present invention. The described embodiment first performs a coarse-matching operation in step 304 and then performs a k-round fine-matching operation in steps 306 and 308. (In the described embodiment, k=2). The motion estimate resulting from the coarse and fine-matching operations is used to generate a motion vector, which describes motion between the reference block and the search block (also called the "current block"). Once determined, the motion vector is used to efficiently transfer data from transmitter 20 to receiver 30 in step 312, as is known to persons of ordinary skill in the art.

Figure 4:
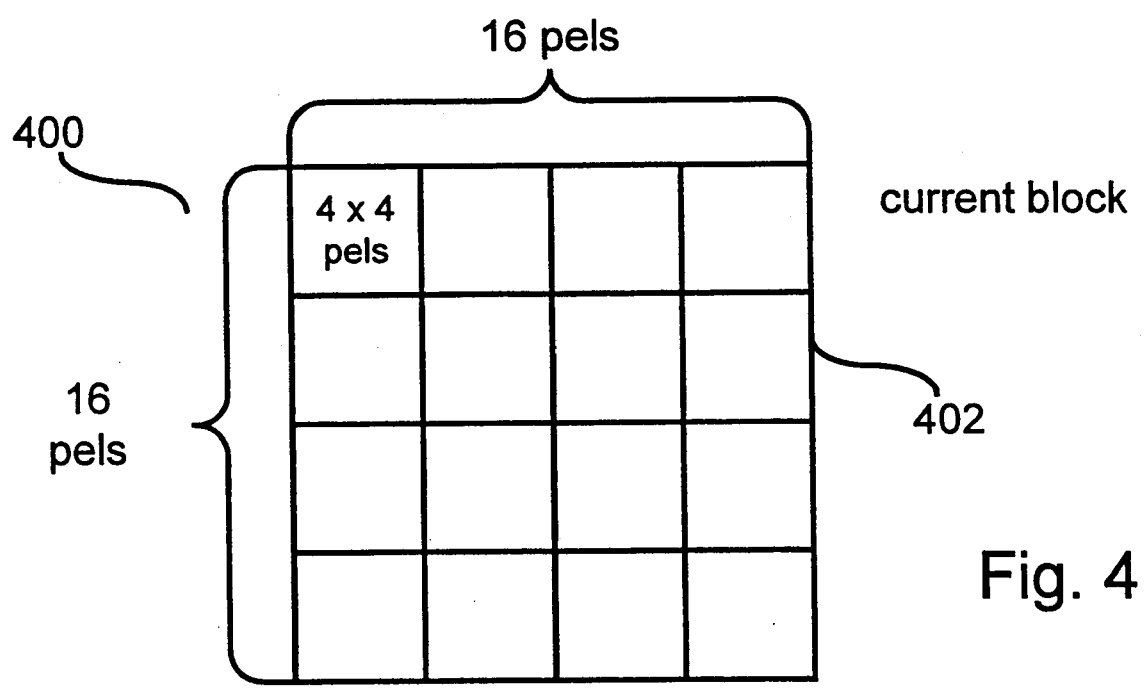
FIG. 4 shows an example of a search block.
Figure 5:
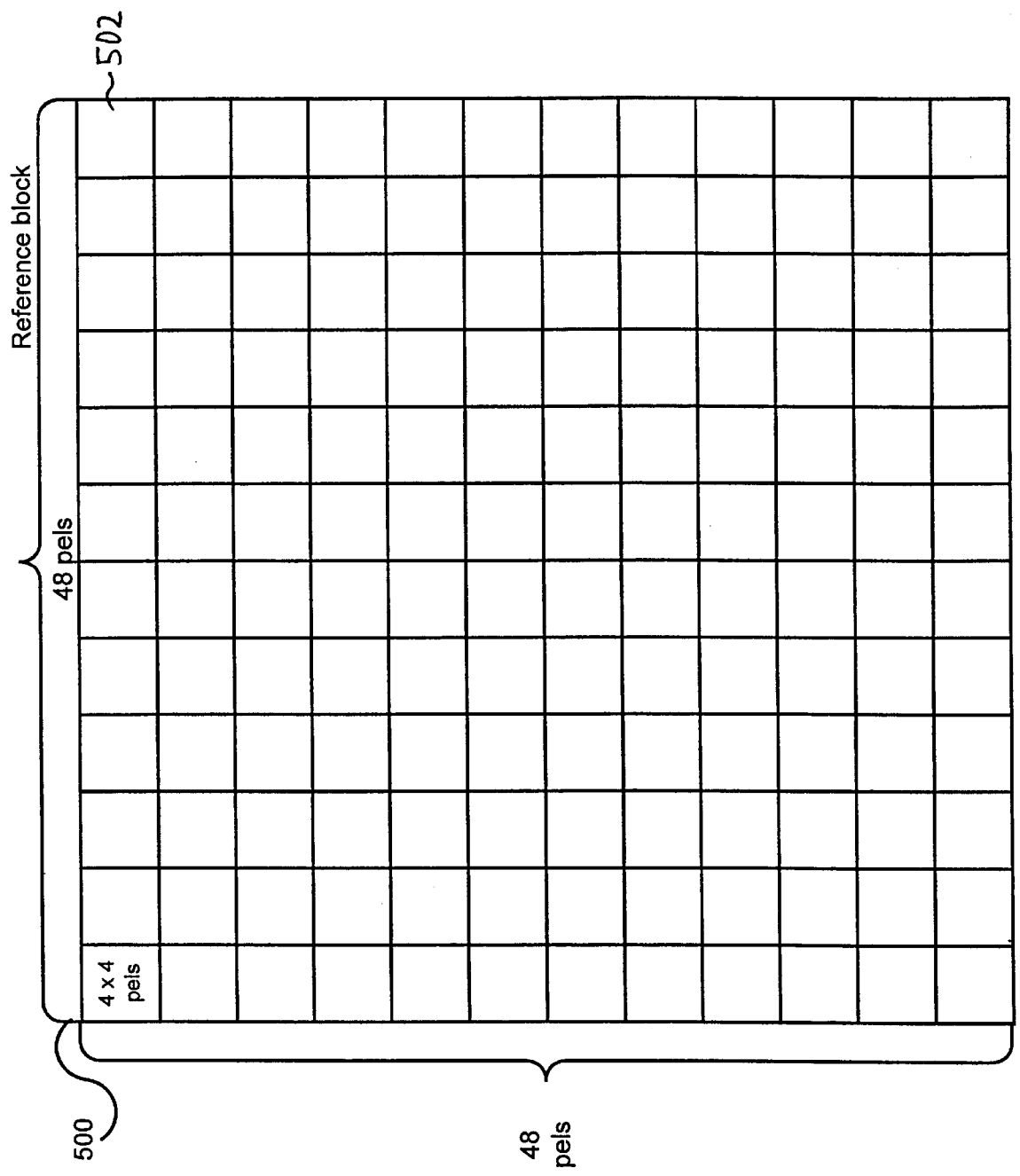
FIG. 5 shows an example of a reference block.

FIG. 4 shows an example of a search block 400. Search block 400 is a 16×16 pel primary pattern in the current frame. Search block 400 is further divided into a plurality of 4×4 pel sub-blocks 402. The sub blocks can be of any size, depending on factors such as the available computational budget. FIG. 5 shows an example of a reference block 500. Reference block 500 is a 48 by 48 pel reference search window to which the search block is to be compared. Reference block 500 is further divided into a plurality of 4×4 pel sub-blocks 502. The sub blocks can be of any size, depending on factors such as the available computational budget. It should be understood that various sizes and relative sizes of blocks and sub-blocks can be used without departing from the spirit and scope of the current invention.

Figure 6:
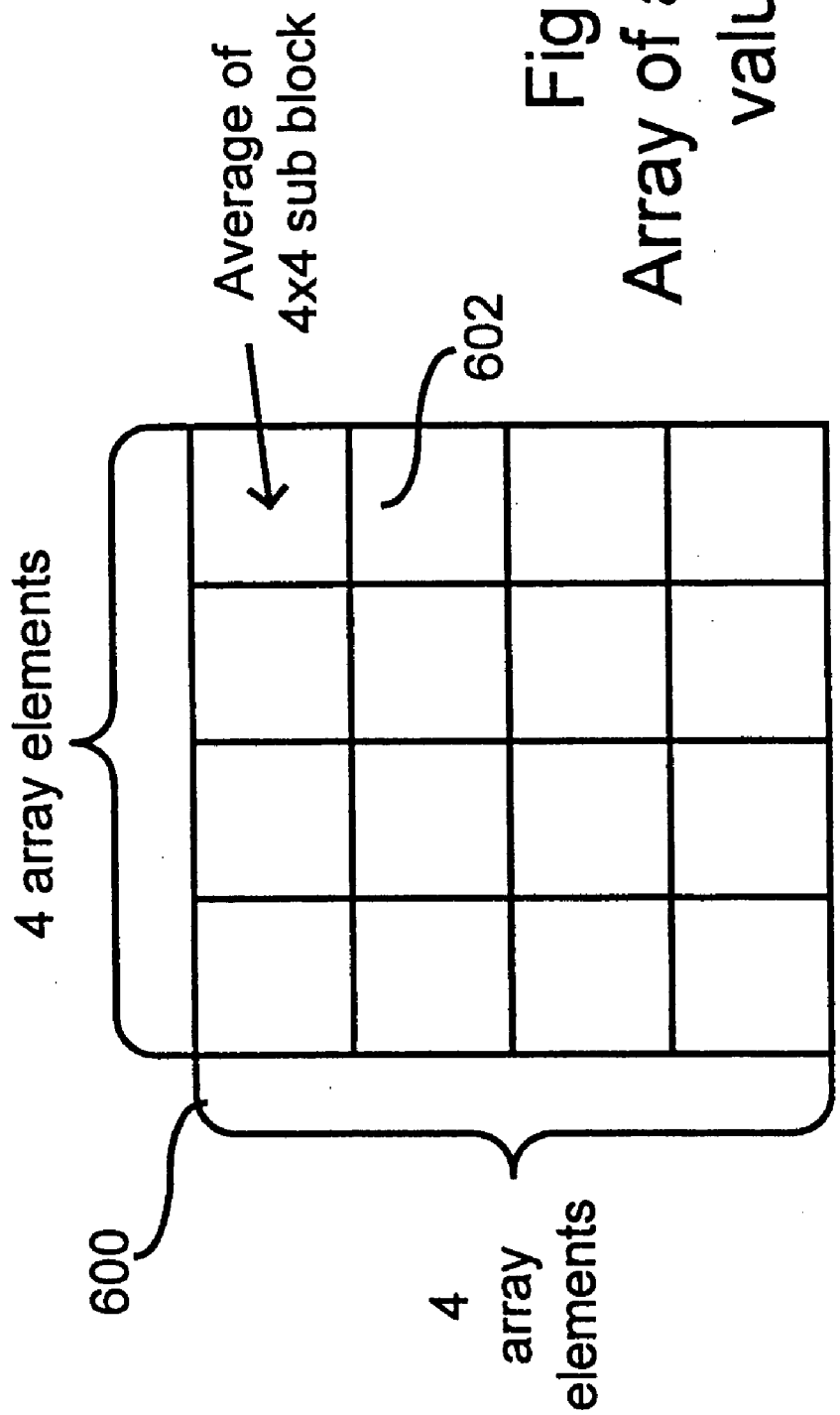
FIG. 6 shows an example of an array of average intensity values corresponding to the search block of FIG. 4, which is used in a course matching step.
Figure 7:
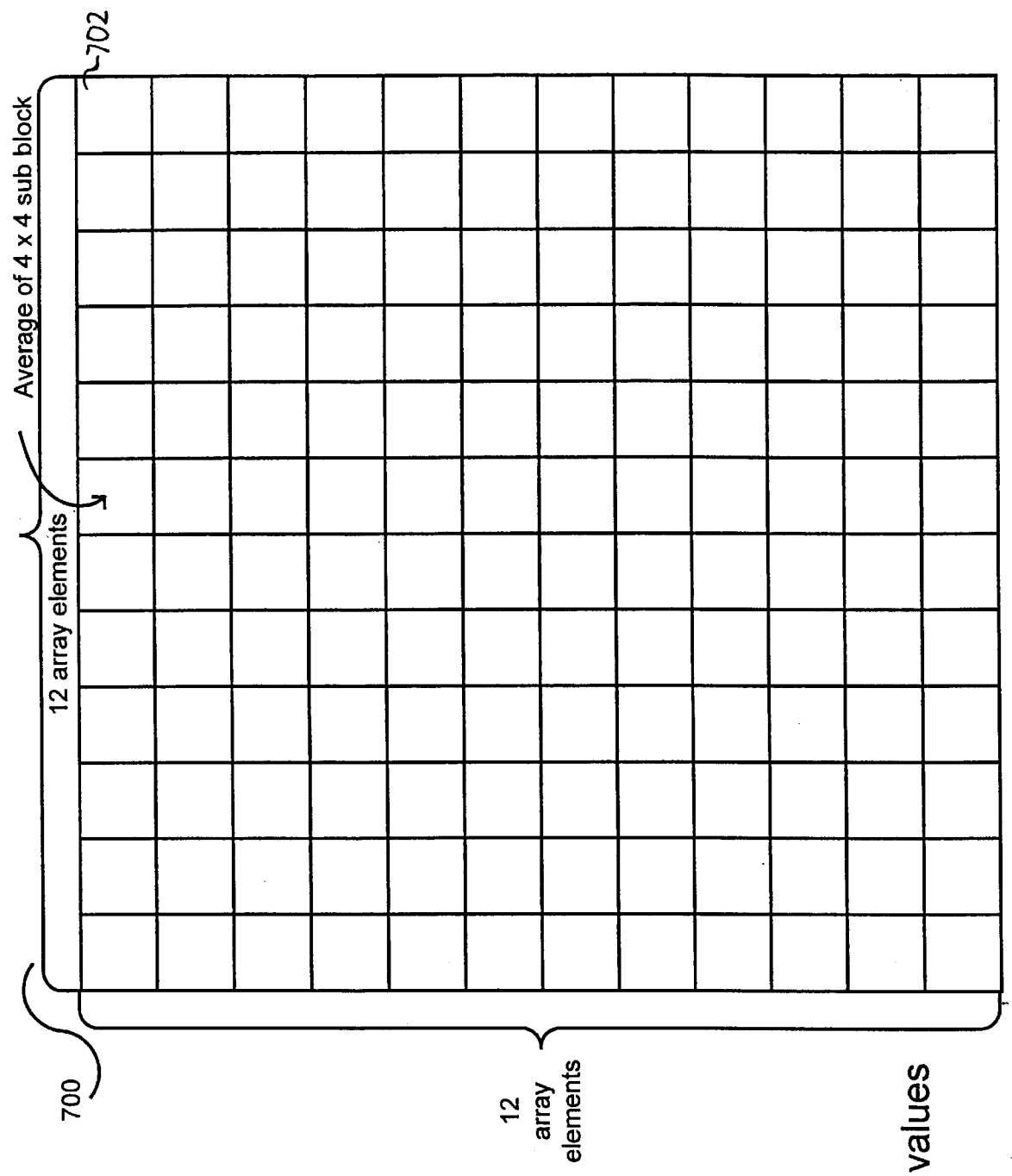
FIG. 7 shows an example of an array of average intensity values corresponding to the reference block of FIG. 5, which is used in the coarse-matching step.

In the coarse-matching step, the average of the intensities of sub-blocks 402, 502 are stored in the arrays shown in FIGS. 6 and 7. FIG. 6 shows an example of an array 600 of average intensity values corresponding to the search block 400 of FIG. 4. Each sub-block 402 has a corresponding entry in the array 600. FIG. 7 shows an example of an array 700 of average intensity values corresponding to the reference block of FIG. 5. Each sub-block 502 has a corresponding entry in the array 700.

Figure 8:
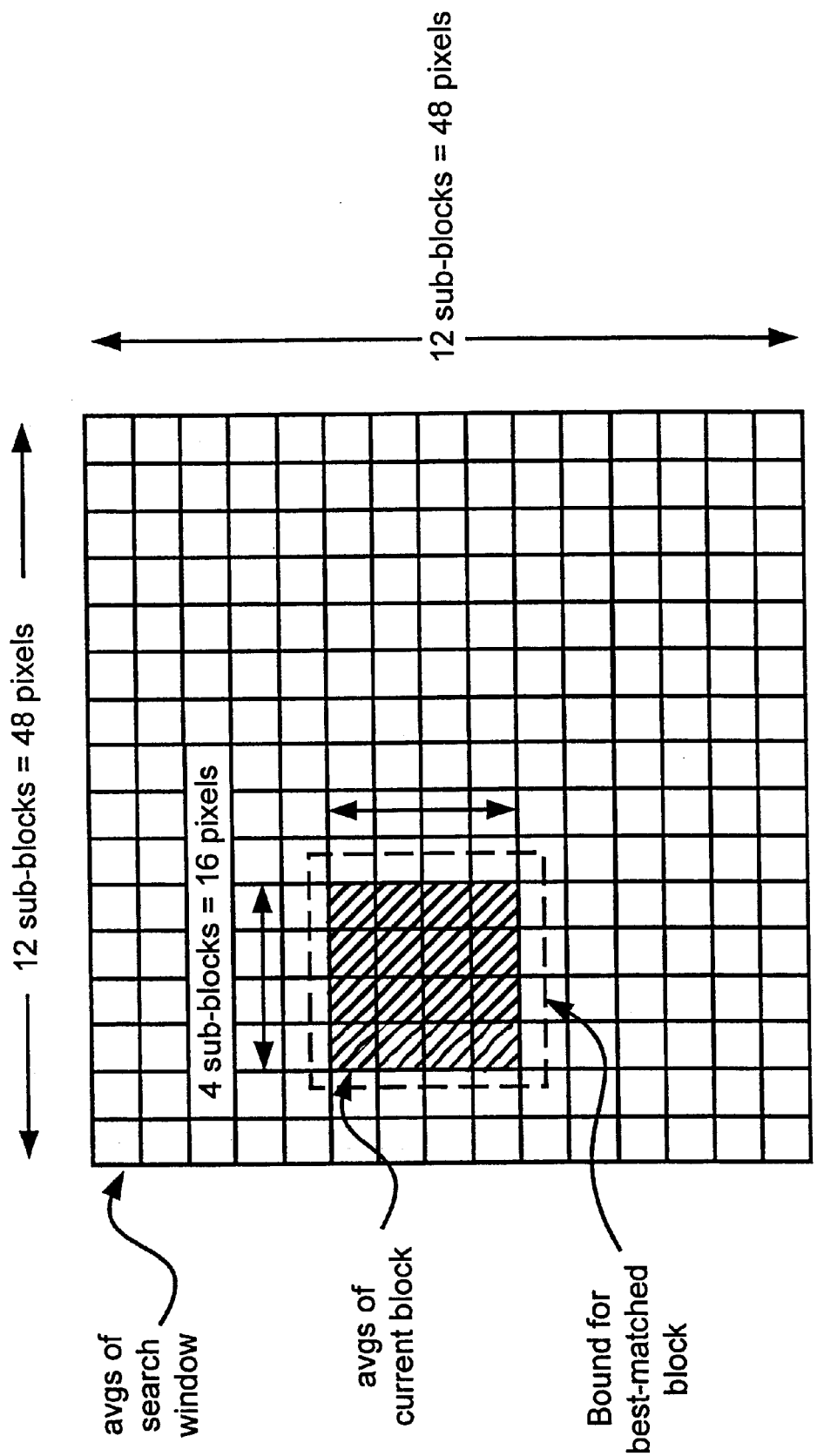
FIG. 8 illustrates a bound for a best-matched block during coarse-matching.

FIG. 8 illustrates a bound for a best-matched block during course-matching. The described embodiment performs a full search for the primary 4×4 array from its 12×12 counterpart to locate the approximate position of the best-match based on the sum of absolute difference criteria. The best-match found in the coarse-matching step is an approximate value. If the two average arrays 600, 700 represent the current pattern and the reference window, it is clear that the exact location of the best-match can at most be only half a sub-block (i.e., 2, in the example) pixels away from the approximate location of the best-match. Therefore, a fine match is performed next to refine the coarse search.

Figure 9:
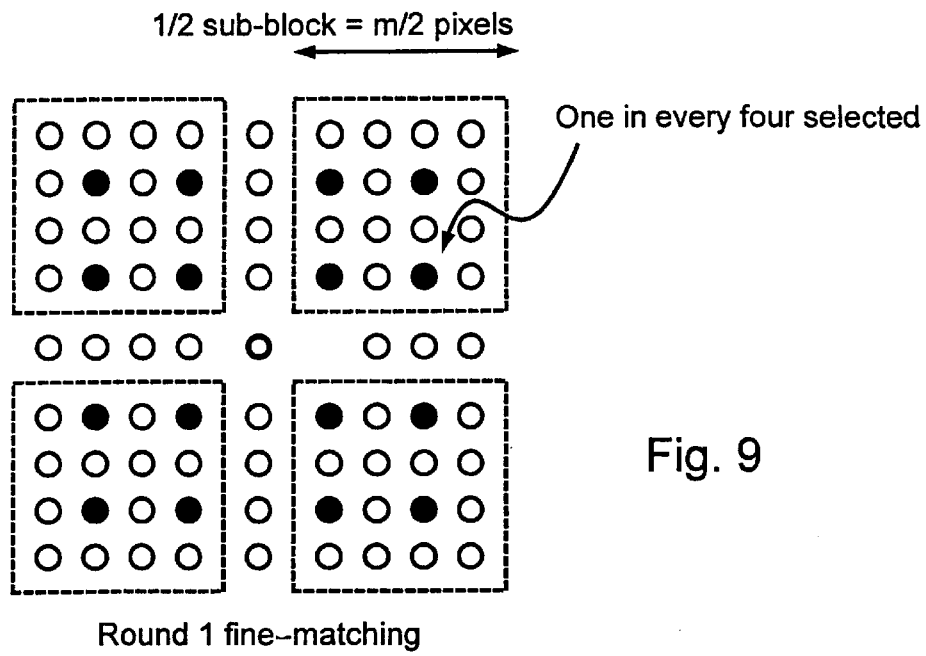
FIG. 9 illustrates the results of a first round in a fine-matching step.

In the described embodiment, the fine-matching step includes k rounds. Although the example given herein shows two rounds, k can have other values as well. FIG. 9 illustrates the results of a first round in a fine-matching step. Because the fine-matching step is concerned with precision, the true pixel values (not averages for a sub-block) are employed in the searching. The process of block matching essentially compares the given primary pattern with possible matches of dimension n-pel-by-n-pel drawn in the N-pel-by-N-pel reference window. Fine-matching is the last step of this process. For ease of presentation, a pixel (e.g., at the top lefthand corner) in each of these possible search targets is used for identification search target. These identification pixels function somewhat like markers for the corresponding n-pel-by-n-pel slices and are thus called "marker pixels." Following an earlier conclusion that the best-matched block can at most be half a sub-block (i.e., 2 pixels) away from the approximate location derived from coarse-matching, an efficient algorithm is designed to exclude overlapping search targets by breaking the task of fine block matching into k separate steps, where k is preferably=2. By doing so, the number of search points is reduced from $(m+1)^2$ to $m^2/4+8$ for m>2, where m is the dimension of the sub-blocks in the last round of coarse-matching. In the described embodiment, n=16 and N=48, although other appropriate values can be used.

Figure 10:
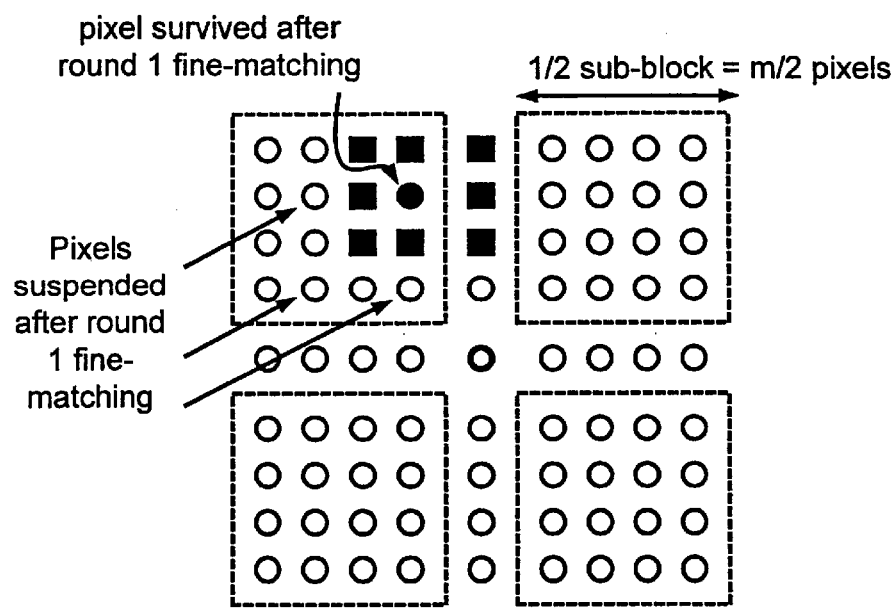
FIG. 10 illustrates the results of a second (kth) round in the fine-matching step.

Details of the fine-matching step is illustrated in FIGS. 9 and 10. In a first round of fine matching, marker pixels pictured in FIG. 9 as black dots (each corresponding to a n-pel-by-n-pel candidate) that surround the best-match from the coarse-matching operation are chosen for processing. The eight marker pixels neighboring the survivor in the first round are then taken for final processing in the second round. The ultimate survivor pixel is therefore the one associated with the best-matched block. Once a match is determined in the kth (e.g., second) round, it is possible to determine the amount of movement between the reference block and the search block.

III. Modifications and Enhancements

While the invention has been described in conjunction with a specific embodiment, it is evident that many alternatives, modifications and variations will be apparent to those skilled in the art in light of the foregoing description. For example, it will be understood that the coarse-matching step introduced above can give rise to an estimated motion vector of up to plus or minus(N−n)/2 pixels. The subsequent fine-matching then contributes a maximum of another plus or minus m/2 pixels, amounting to a range of plus or minus(N−n+m)/2 pixels in the resulting motion vector. If the allowable motion vector falls in a smaller range, then apart from a trespass into the forbidden region, the disparity also signifies an unnecessary spending of computational power. A more efficient alternative is to divide the reference window symmetrically into a smaller number of sub-blocks of the same size, instead of (N/m)x(N/m) of them, so as to exclude the search area from the forbidden site. The motion vector will then be clipped to the permissible range accordingly.

For faster settling of the image seen by the receiving party when the video source on the transmitting side contains only stationary pictures, it is always desirable to bias the motion vector mildly towards zero to reduce its sensitivity to noise and minor changes between frames. Hence, an extra search target corresponding to the zero motion vector is prepared in the fine-matching, and its sum of absolute difference score is deducted by a specified value as a bias.

Another modification of considerable significance is the use of sub-sampling in both the coarse and fine-matching. In performing averaging on the pixel values in the sub-blocks in coarse-matching, it is found that no notable difference can be observed if only half of the entire population of m×m pixels is chosen in every sub-block in a checker board pattern for processing. The same is true when calculating the sum of absolute difference in the fine-matching procedure.

Figure 3B:
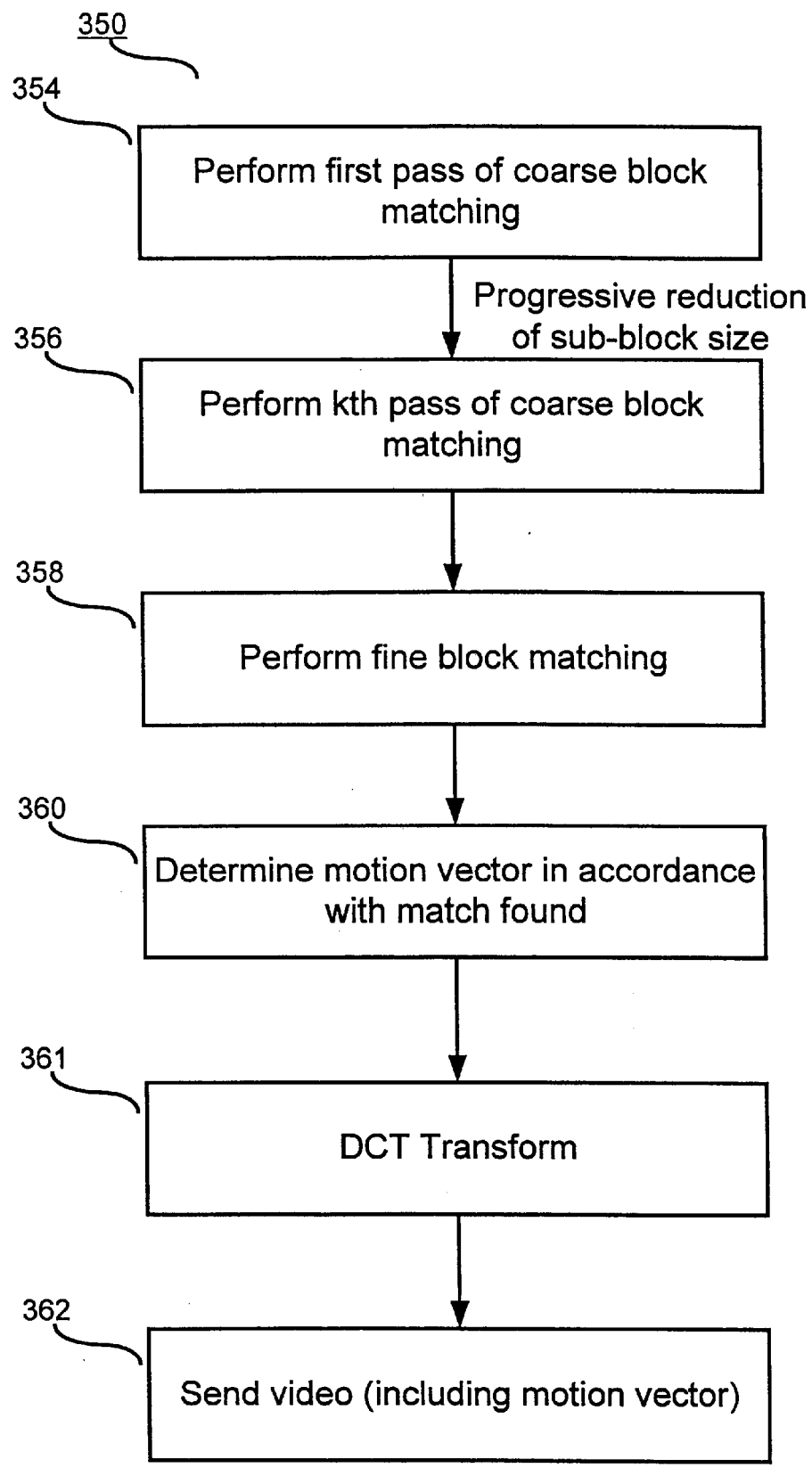
FIG. 3(b) is a flow chart showing steps of another method of motion estimation in accordance with another preferred embodiment of the present invention.

As shown in FIG. 3(b), for a large search space, the method of the present invention can be generalized from a two-layer matching strategy to k layers, where k>2. Following the first layer coarse-matching in step 354, the second layer coarse-matching is performed in step 356 and so on in a similar fashion. Fine-matching is carried out only in the final layer in step 358.

The approximate solution in coarse-matching may sometimes be too crude to locate the correct search site for subsequent steps of matching when the sub-blocks involved are of too large a size. This problem arises especially when multiple layers of coarse-matching are concerned. In such a case, instead of a single survivor, a fixed number of multiple survivors can be kept after each round to lower the possibility of diverted search paths.

The described embodiments of the present invention has been implemented and tested on video sequences on typical scenes of video conferencing. The method proved to be effective and are believed to achieve an average signal-to-noise ratio of approximately 95% of that using full search, while performing the search with significantly lower use of computing resources.

Accordingly, it is intended to embrace all such alternatives, modifications and variations as fall within the spirit and scope of the appended claims and equivalents.

What is claimed is:

1. A method of generating a motion vector for a search block of video data, comprising the steps performed by a video processing system, of:

performing a coarse-matching operation on the video data, which compares sub-blocks of the video data to sub-blocks of reference data, wherein a summary measure of the video data in said sub-blocks is employed for limiting a number of matching comparisons, and wherein said coarse matching operation provides a first best-matched block candidate pixel;

performing, after the coarse-matching operation, a fine-matching operation, which compares the video data to reference data wherein said fine matching operation comprises:

a first fine matching iteration testing candidates from alternating pixels in four areas centered around said first best-matched block candidate pixel, each of said four areas half the dimension of said sub-blocks, said first fine matching iteration establishing a second best-matched block candidate pixel; and a second fine matching iteration testing candidates from pixels immediately surrounding said second best-matched block candidate pixel.

2. The method of claim 1, wherein at least one of the sub-blocks of video data is 4×4 pixels in size.

3. The method of claim 1, wherein at least one of the sub-blocks of reference data is 4×4 pixels in size.

4. The method of claim 1, wherein the video data is 16×16 pixels in size.

5. The method of claim 1, wherein the reference data is 48×48 pixels in size.

6. The method of claim 1, wherein the first fine-matching iteration comprises a search over a 16 point field surrounding the first best-matched block candidate pixel.

7. The method of claim 1, where the fine-marching operation, in a first iteration, compares one in every four pixels of a plurality of pixels surrounding a best-matched found in the coarse-matching operation.

8. The method of claim 1, further including the step of determining a motion vector in accordance with results of the coarse-matching and fine-matching operations.

9. The method of claim 1, wherein the coarse-matching step includes a plurality of layers of coarse-matching.

10. An apparatus that generates a motion vector for a search block of video data, comprising:

a portion configured to perform a coarse-matching operation on the video data, which compares sub-blocks of the video data to sub-blocks of reference data, wherein a summary measure of the video data in said sub-blocks is employed for limiting a number of matching comparisons, and wherein said coarse matching operation provides a first best-matched block candidate pixel;

a portion configured to perform, after the course-matching operation a first fine matching iteration testing candidates from alternating pixels in four areas centered around said first best-matched block candidate pixel, each of said four areas half the dimension of said sub-blocks, said first fine matching iteration establishing a second best-matched block candidate pixel; and a portion configured to perform a second fine matching iteration testing candidates from pixels immediately surrounding said second best-matched block candidate pixel.

11. The apparatus of claim 10 wherein at least one of the sub-blocks of video data is 4×4 pixels in size.

12. The apparatus of claim 10 wherein at least one of the sub-blocks of reference data is 4×4 pixels in size.

13. The apparatus of claim 10 wherein the video data is 16×16 pixels in size.

14. The apparatus of claim 10 wherein the reference data is 48×48 pixels in size.

15. The apparatus of claim 10, wherein the first fine-matching iteration comprises a search over a 16 point field surrounding the first best-matched block candidate pixel.

16. The apparatus of claim 10 where the fine-matching operation, in a first iteration, compares one in every four pixels of a plurality of pixels surrounding a best-match found in the coarse-matching operation.

17. A computer program product including a computer usable medium having computer readable code embodied therein for generating a motion vector for a search block of video data, the computer program product comprising:

computer readable program code devices configured to cause a computer to effect performing a coarse-matching operation on the video data, which compares sub-blocks of the video data to sub-blocks of reference data, wherein a summary measure of the video data in said sub-blocks is employed for limiting a number of matching comparisons, and wherein said coarse matching operation provides a first best-matched block candidate pixel;

computer readable program code devices configured to cause a computer to effect performing, after the coarse-matching operation a first fine matching iteration testing candidates from alternating pixels in four areas centered around said first best-matched block candidate pixel, each of said four blocks half the dimension of said sub-blocks, said first fine matching iteration establishing a second best-matched block candidate pixels; and computer readable program code devices configured to cause a computer to effect performing a second fine matching iteration testing candidates from pixels immediately surrounding said second best-matched block candidate pixel.

* * * * *